US008031168B2

(12) United States Patent
Feenstra et al.

(10) Patent No.: US 8,031,168 B2

(45) Date of Patent: Oct. 4, 2011

(54) DISPLAY DEVICE HAVING AN ELECTRODE PARTIALLY COVERING A PICTURE ELEMENT

(75) Inventors: Bokke Johannes Feenstra, Eindhoven (NL); Robert Andrew Hayes, Eindhoven (NL)

(73) Assignee: Samsung LCD Netherlands R&D Center B.V., Eindhoven (NL)

( * ) Notice: Subject to any disclaimer, the term of this patent is extended or adjusted under 35 U.S.C. 154(b) by 597 days.

(21) Appl. No.: 10/557,377

(22) PCT Filed: May 14, 2004

(86) PCT No.: PCT/IB2004/050697

§ 371 (c)(1), (2), (4) Date: Nov. 18, 2005

(87) PCT Pub. No.: WO2004/104671

PCT Pub. Date: Dec. 2, 2004

(65) Prior Publication Data

US 2006/0221068 A1 Oct. 5, 2006

(30) Foreign Application Priority Data

May 22, 2003 (EP) .................................... 03101473

(51) Int. Cl.
*G09G 3/34* (2006.01)

(52) U.S. Cl. ....................................................... 345/107

(58) Field of Classification Search .......... 345/105–107; 359/296; 385/16–19
See application file for complete search history.

(56) References Cited

U.S. PATENT DOCUMENTS

| | | | | |
|---|---|---|---|---|
| 4,079,368 | A * | 3/1978 | DiStefano | 345/60 |
| 5,659,330 | A | 8/1997 | Sheridon | |
| 5,757,345 | A | 5/1998 | Sheridon | |
| 6,449,081 | B1 | 9/2002 | Onuki et al. | |
| 6,603,444 | B1 | 8/2003 | Kawanami et al. | |
| 7,147,763 | B2 * | 12/2006 | Elrod et al. | 204/547 |
| 7,420,549 | B2 * | 9/2008 | Jacobson et al. | 345/204 |
| 2003/0012483 | A1 * | 1/2003 | Ticknor et al. | 385/16 |
| 2003/0021521 | A1 * | 1/2003 | Hayashi et al. | 385/16 |
| 2004/0263947 | A1 * | 12/2004 | Drzaic et al. | 359/296 |

FOREIGN PATENT DOCUMENTS

| | | | |
|---|---|---|---|
| EP | 0783122 | A2 | 9/1997 |
| EP | 0806753 | A1 | 11/1997 |
| JP | 2000356750 | A | 12/2000 |

* cited by examiner

*Primary Examiner* — Kevin Nguyen
*Assistant Examiner* — Randal Willis
(74) *Attorney, Agent, or Firm* — H.C. Park & Associates, PLC

(57) ABSTRACT

An optical switch, e.g., a display cell based on layer displacement or layer break up having at least two different states, in which one fluid, e.g. oil, in a first state adjoins at least a first support plate, and in the second state, another fluid at least partly adjoins the first support plate. Part of an otherwise homogeneous electrode is removed to realize oil motion control.

15 Claims, 2 Drawing Sheets

12 12 12 4 5 6 20 2 10 22 7 8 3 21 1

DISPLAY DEVICE HAVING AN ELECTRODE PARTIALLY COVERING A PICTURE ELEMENT

Figure 1A:
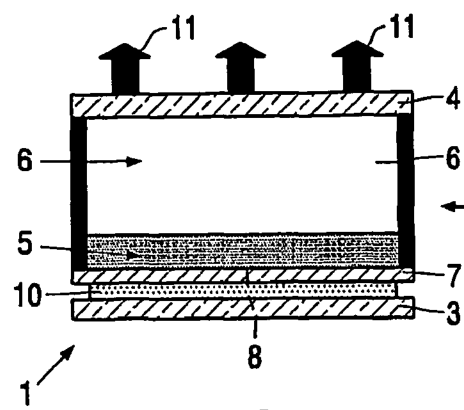

The invention relates to an optical switch having at least one first fluid and a second fluid immiscible with each other within a space between a first transparent support plate and a second support plate, the second fluid being electroconductive or polar. In particular the invention relates to a display device comprising picture elements having at least one first fluid and a second fluid immiscible with each other within a space between a first transparent support plate and a second support plate, the second fluid being electroconductive or polar.

Optical switches may be used in shutter applications, diaphragms, but also in switchable color filters in e.g. display applications.

Display devices like TFT-LCDs are used in laptop computers and in organizers, but also find an increasingly wider application in GSM telephones. Instead of LCDs, for example, (polymer) LED display devices are also being used.

Apart from these display effects which are well established by now other display techniques are evolving like electrophoretic displays, which are suitable for paper white applications.

The invention is based on a principle called electro-wetting. The invention provides new ways of using this principle.

If for instance a (first) fluid is a (colored) oil and the second (the other) fluid is water (due to interfacial tensions) a two layer system is provided which comprises a water layer and an oil layer. However, if a voltage is applied between the water and an electrode on the first support plate the oil layer moves aside or breaks up due to electrostatic forces. Since parts of the water now penetrate the oil layer the picture element becomes partly transparent.

If homogeneous (Indium Tin Oxide) electrodes are used to address the picture elements, since this is the simplest way, the electric field is applied across the entire picture element Hence, in principle, there is no preferred direction for the (first) fluid (the oil) to move to. However, in practice there will always be a (small) inhomogeneity inside the picture element (insulator or oil thickness variation, slight irregularity in a pixel wall, etcetera) that will determine which way the (first) fluid (the oil) will move. As a result always the same motion occurs upon voltage application. However, the motion will vary from pixel to pixel. For several reasons, including grey-scale homogeneity and reducing the chance of oil mixing between adjacent pixels, the oil motion should be better controlled.

To this end a display device according to the invention comprises within each picture element a first electrode only partly covering the total area of the picture element Preferably the first electrode at least leaves clear a part of the picture element along an edge of the picture element.

When a voltage is applied, there will be an electric field at the places where the electrode is present Effectively this region will become more wettable for the second fluid (more hydrophilic in an oil-water system). On the other hand, at places where no electrode is present there will be no electric field, and thus this region will be less wettable for the second fluid (more hydrophobic). As a result, the oil will tend to move toward the least wettable region.

In a particular embodiment a display device according to the invention comprises at least one further electrode at the remaining area of the picture element. If driving means are present to apply voltages to the first and further electrodes the oil motion can be enhanced.

These and other aspects of the invention are apparent from and will be elucidated with reference to the embodiments described hereinafter.

Figure 1B:
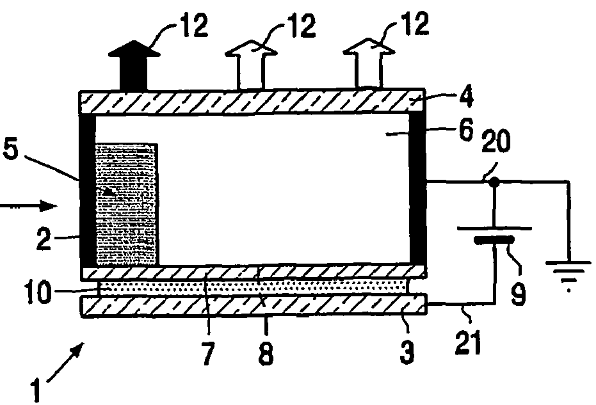
Figure 2A:
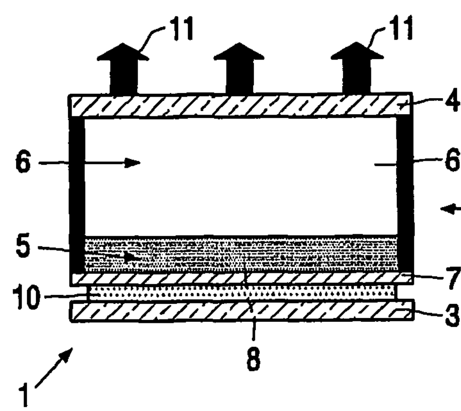
Figure 2B:
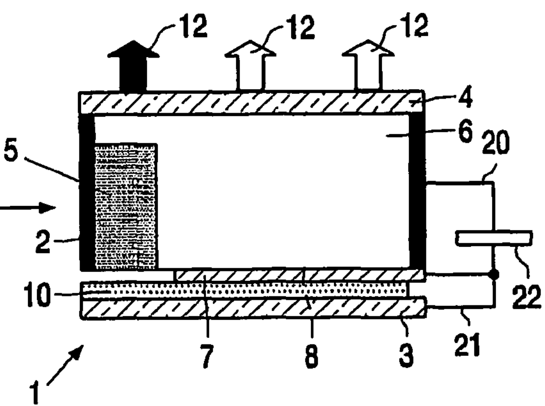
Figure 3:
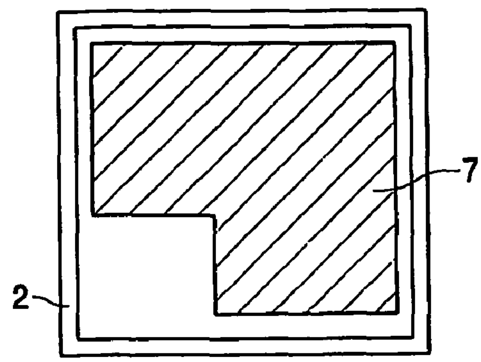
Figure 4:
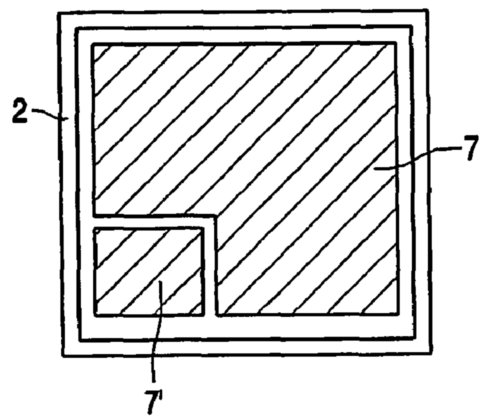
Figure 5:
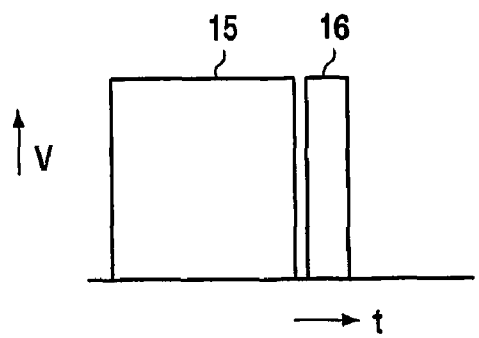

In the drawings:

FIG. 1 is a diagrammatic cross-section of a part of a display device according to the invention, FIG. 2 is another diagrammatic cross-section of a part of a display device according to the invention, while FIGS. 3 and 4 are plan views of a part of a display device according to the invention and FIG. 5 shows driving voltages The Figures are diagrammatic and not drawn to scale. Corresponding elements are generally denoted by the same reference numerals.

FIG. 1 shows a diagrammatic cross-section of a part of a display device 1 according to the invention. Between two transparent substrates or support plates 3, 4 a first fluid 5 and a second fluid 6 are provided, which are immiscible with each other. The first fluid 5 is for instance an alkane Like tetradecane or hexadecane or as in this example a (silicone) oil. The second fluid 6 is electroconductive or polar, for instance water or a salt solution (e.g. a solution of KCl in a mixture of water and ethyl alcohol).

In a first state, when no external voltage is applied (FIG. 1*a*) the fluids 5, 6 adjoin the first and second transparent support plates 3, 4 of e.g. glass or plastic. On the first support plate 3 a (transparent) electrode 7, for example indium (tin) oxide is provided and an intermediate less wettable (hydrophobic) layer 8, in this example an amorphous fluoropolymer (AF1600).

When a voltage is applied (voltage source 9) via interconnections 20, 21 the layer 5 moves aside or breaks up into small droplets (FIG. 1*b*, fragmented film). This occurs when the electrostatic energy gain is larger than the surface energy loss due to the creation of curved surfaces. As a very important aspect it was found that reversible switching between a continuous film 5 covering the support plate 3 and a film adjoining the wall 2 is achieved by means of the electrical switching means (voltage source 9).

FIG. 2 shows an embodiment of a display device according to the invention, in which part of the electrode 7 has been left away (see also FIG. 3). When a voltage is applied, there will be an electric field at the places where the electrode (ITO) is present. In this region the coating will become more wettable for the second fluid. On the other hand, at the lower left hand corner (FIG. 3) where there is no electrode (ITO) present there will be no electric field, and thus the coating will remain less wettable. As a result, the oil will tend to move toward the least wettable region: the lower left hand corner. As a result, always the same motion towards especially designed corners of display cells occurs upon voltage application.

Voltages are applied by means of a driving unit 22. The size of the area of ITO that is removed should be chosen properly. When a large area is chosen, the remnant oil area will consequently be rather large, thereby reducing the brightness of the display. On the other hand, when the chosen area becomes too small, the oil motion will no longer have a preference to move into this corner. Preferably at least a part along the edge of the picture element comprising 5% of the total area of the picture element is kept clear, while at most a part along the edge of the picture element comprising 50% (preferably 10%) of the total area of the picture element is kept clear.

In a matrix driven display device a matrix of switching elements e. g. thin film transistors (TFT) may be chosen for applying the driving signals. The thin film transistors preferably are located at the areas where no electrodes 7 are present.

If necessary this area (and also inter-pixel areas) may be covered by a black matrix to enhance contrast.

FIG. 4 shows another embodiment in which a corner of the picture element has been provide with a further electrode 7'. Voltage pulses (see FIG. 5) are provided to electrodes 7, 7' to accelerate the retraction of the oil film. First, a voltage pulse 15 is applied to electrode 7 to remove the oil from most of the active area Electrode 7' is grounded and as a result, the oil will move into the corresponding corner of the picture element. After the voltage on electrode 7 has been removed, a short voltage pulse 16 is applied to electrode 7'. As a result, the oil is removed from electrode 7' and redistributed over the rest of the picture element. When the voltage on electrode 7' is removed, the oil will also spread over this part of the picture element.

The electrode configuration chosen here is merely an example. Other electrode configurations can be chosen, such as a circular geometry. Such a circular geometry is used in e.g. shutter applications and diaphragms.

The electrode on which the oil is collected should be as small as possible compared to the total size, while still being sufficiently large to determine the direction of motion.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention claimed is:

1. An optical switch for a picture element, the optical switch comprising:

a first transparent support plate;

a second support plate;

a first fluid;

a second fluid immiscible with the first fluid within a space between the first transparent support plate and the second support plate, the second fluid being electroconductive or polar;

a first electrode on at least one of the support plates, the first electrode only partly covering a total area of the picture element leaving a remaining part of the optical switch not covered by the first electrode; and a second electrode covering at least a portion of the remaining part; and a pulse generator configured to provide to the first electrode a first pulse having a first pulse width while the second electrode is grounded and, after removal of the first pulse, to provide to the second electrode a second pulse having a second pulse width, wherein the second pulse width is smaller than the first pulse width; and wherein the first electrode is substantially along an entire first edge and an entire second edge of the optical switch, and the second electrode is along a third edge of the optical switch.

2. The optical switch according to claim 1, wherein the remaining part is one of the corners of a substantially rectangular optical switch.

3. The optical switch according to claim 1, wherein the remaining part comprises 5% of a total area of the optical switch.

4. The optical switch according to claim 1, wherein the remaining part comprises 50% of a total area of the optical switch.

5. The optical switch according to claim 1, wherein the remaining part comprises 10% of a total area of the optical switch.

6. The optical switch according to claim 1, further comprising at least one further electrode at the remaining part of the optical switch.

7. The optical switch according to claim 6, further comprising driving means to apply voltages to the first electrode and the further electrode.

8. A display device comprising picture elements, the picture element having the optical switch according to claim 1.

9. The display device according to claim 8, further comprising switching devices at the remaining part left clear by the first electrode.

10. The display device according to claim 9, wherein the remaining part left clear by the first electrode is covered by a black mask.

11. A display comprising a plurality of picture elements, wherein each picture element includes:

two fluids which are immiscible with each other located between support plates;

a first electrode on at least one of the support plates, the first electrode only partly covering a total area of the picture element, leaving a remaining area not covered by the first electrode, wherein the picture elements have remaining areas at substantially same positions so that a first fluid of the two fluids moves towards the same positions of the picture elements upon application of a voltage to the first electrode, wherein the first electrode is substantially along an entire first edge and an entire second edge of the picture element, and the remaining area is along a third edge of the picture element;

a second electrode covering at least a portion of the remaining area; and a pulse generator configured to provide to the first electrode a first pulse having a first pulse width while the second electrode is grounded and, after removal of the first pulse, to provide to the second electrode a second pulse having a second pulse width, wherein the second pulse width is smaller than the first pulse width.

12. The display of claim 11, wherein the same positions includes the third edge of each of the picture elements.

13. The display of claim 11, wherein the same positions includes at least one corner of each of the picture elements.

14. The display of claim 11, wherein the each picture element further includes a second electrode located at the remaining area, so that application of a voltage to the second electrode moves the first fluid away from the remaining area.

15. The display of claim 14, wherein the first fluid is oil which is spread over remaining area upon removal of the voltage to the second electrode.

* * * * *